B. F. ROBERTS.
TIRE TIGHTENER.
No. 273,608. Patented Mar. 6, 1883.
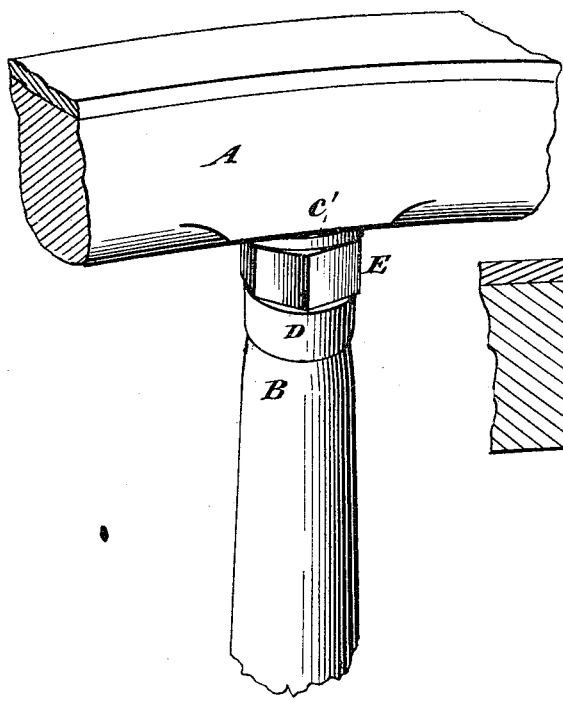
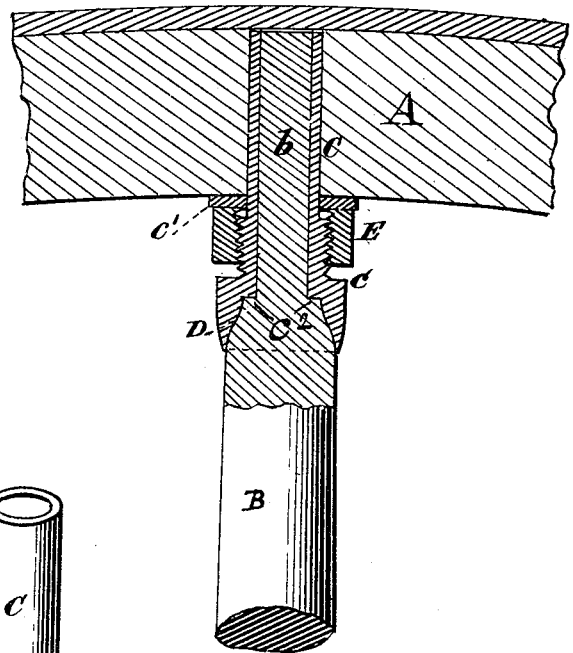
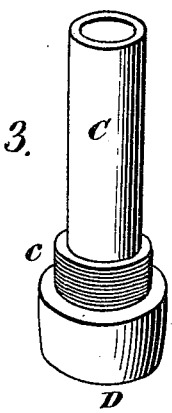
Witnesses.
A. Ruppert,
Jas. H. Lange.
Inventor:
Benjamin F. Roberts.
per Edson Bro's,
Attorneys.

UNITED STATES PATENT OFFICE.

BENJAMIN F. ROBERTS, OF LEON, IOWA, ASSIGNOR OF ONE-HALF TO J. A. RAY AND H. THOMAS, OF SAME PLACE.

TIRE-TIGHTENER.

SPECIFICATION forming part of Letters Patent No. 273,608, dated March 6, 1883.

Application filed February 16, 1880.

*To all whom it may concern:*

Be it known that I, BENJAMIN F. ROBERTS, of Leon, in the county of Decatur and State of Iowa, have invented certain new and useful Improvements in Tire-Tighteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1 is a perspective view of my improvement as applied to the felly and spoke of a wheel, and broken away. Fig. 2 is a vertical section thereof, and Fig. 3 is a detail perspective view of my improvement.

This invention relates to improvements in means for tightening up the spokes and fellies of wheels without having to heat and cut the tires, as adopted, to shrink or reduce the diameter of the tire and by that means tighten up the aforesaid parts; and it consists of a sleeve fitted upon the tenon of the spoke, and with an annular nut with or without a washer or plate, and its outer end provided with an interiorly-beveled flange or socket fitting around the shoulder of the spoke, and with its open end fitting flush with the general surface of the spoke, substantially as hereinafter more fully set forth.

In the accompanying drawings, A marks the felly fitted with a tire, and B is the spoke of a wheel formed with the usual tenon, $b$.

C is a sleeve fitted upon the tenon $b$ of the spoke B and entering the felly A. The outer end of this sleeve is provided with an interiorly-beveled socket or flange, D, in addition to being adapted, by having a lateral inward extension, $c^2$, to fit upon the shoulder of the spoke, as clearly seen in Fig. 2. The flange or socket D, whose inner beveled surface terminates flush with the general surface of the spoke, has the effect to brace or re-enforce the shouldered part of the spoke to prevent the spreading or crushing of the shoulder as pressure is exerted upon the same by the tightening of the sleeve, in that the surrounding flange of the socket D will resist lateral pressure or the tendency to spread of the shoulder, while by its inner lower end terminating flush with the general surface or exterior of the spoke the vertical pressure of the sleeve will be distributed upon the spoke and no frail or slender portion thereof be exposed to the edge of the sleeve, thereby preventing any possible crushing, chipping, or splitting of the spoke. These are manifest disadvantages or objections to which at least one of the former methods of tightening tires or the fellies and spokes is open.

E is an annular nut, fitted upon a screw-threaded portion, $c$, of the sleeve C, with a washer or plate, $c'$, interposed between it and the felly. By turning the nut in the required direction as the fellies and spokes shrink they can be tightened up without having to cut and heat the tire and weld and shrink it upon the fellies to tighten up the said parts. It will be observed that the sleeve C extends entirely through the mortise in the felly, and, surrounding the spoke-tenon, forms a rigid and secure connection, while the interior bevel is possessed of the advantages hereinbefore set forth.

I am aware that a nut and screw have been before used to tighten tires and lengthen spokes; but in all such constructions known to me the sleeve described as my invention, extending through the fellies and having the interior bevel, is wanting.

I am also aware that the sleeve has been formed to receive the tenon of the spoke, the square inner end of the sleeve abutting against a square shoulder upon the spoke; but in such construction the great force employed is liable to sever the longitudinal fibers, and they will press outward, showing a ragged and unsightly appearance; besides, leaving the fiber ends thus unconfined allows the ready destruction consequent upon the separation of the fibers. In my invention all the ends of the fibers are confined within the mouth of the sleeve, and the incline serves to hold them together, rendering splitting impossible.

Heretofore the sleeves employed have lacked the important features of snugly fitting and passing entirely through the mortise in the felly, and snugly fitting throughout its tenoned portion the spoke, the interior of the sleeve being provided with an inward square shoulder and an adjacent outwardly-flaring shoulder, said shoulders merging the one into the other, as herein set forth.

Having thus fully described my invention, I claim and desire to secure by Letters Patent—

In a tire-tightener of the class described, the hollow sleeve C, adapted to snugly fit the mortise in the felly A, and to pass entirely through the same, and provided with the external screw-threads, $c$, and with the internal square shoulder, $c^2$, merged into an outwardly-flaring shoulder, in combination with the spoke B, shaped to snugly fit the interior of the sleeve throughout its length, the washer $c'$, and the nut E, substantially as shown and described.

In testimony that I claim the foregoing I have hereunto set my hand this 23d day of January, 1880.

BENJAMIN F. ROBERTS.

Witnesses:
H. THOMAS,
E. W. HANSEM.